United States Patent
Obrecht et al.

(10) Patent No.: US 6,620,886 B2
(45) Date of Patent: *Sep. 16, 2003

(54) NBR GELS IN BUTYL RUBBER COMPOUNDS

(75) Inventors: Werner Obrecht, Moers (DE); Anthony Sumner, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/005,442

(22) Filed: Dec. 4, 2001

(65) Prior Publication Data

US 2002/0111432 A1 Aug. 15, 2002

(30) Foreign Application Priority Data

Dec. 7, 2000 (DE) .......................... 100 61 174

(51) Int. Cl.⁷ .................. C08L 23/00; C08L 23/04; C08F 8/00
(52) U.S. Cl. ................. 525/191; 525/204; 525/213; 525/214; 525/232; 525/230; 525/240
(58) Field of Search ................ 525/191, 204, 525/213, 214, 232, 238, 240

(56) References Cited

U.S. PATENT DOCUMENTS

| 4,107,234 A | 8/1978 | Cornell |
| 5,124,408 A | 6/1992 | Engels et al. ................ 525/215 |
| 5,395,891 A | 3/1995 | Obrecht et al. ............. 525/194 |
| 6,127,488 A | 10/2000 | Obrecht et al. .......... 525/333.3 |
| 6,372,857 B1 | 4/2002 | Obrecht et al. .......... 525/332.6 |
| 6,399,706 B1 * | 6/2002 | Obrecht et al. ............. 525/191 |

FOREIGN PATENT DOCUMENTS

| DE | 197 01 487 A1 | 7/1998 |
| DE | 199 39 865 A1 | 7/1998 |
| DE | 199 29 347 | 6/2001 |
| EP | 0 313 917 | 10/1988 |
| GB | 966260 | 8/1964 |

OTHER PUBLICATIONS

Handbuch für die Gummiindustrie (month unavailable) 1991, pp. 207–230 and 207–221, Zusammenfassende Beschreibung und Sortiment, Polysar Butyl.

Patent Abstracts of Japan vol. 008, No. 112 (M–298), Mar. 25, 1984 & JP 59 020705 A Yokohama Gomu KK), Feb 2, 1984 Zusummenfassung.

* cited by examiner

Primary Examiner—Nathan M. Nutter
(74) Attorney, Agent, or Firm—Joseph C. Gil; Noland J. Cheung; Jennifer R. Seng

(57) ABSTRACT

The rubber mixtures according to the present invention comprising uncrosslinked butyl rubbers and nitrile-containing rubber gels as well as optionally, conventional additives and auxiliary substances, are suitable for the production of vulcanizates and molded rubber bodies of all kind having low gas permeability, low weight and acceptable mechanical properties, the mixtures exhibiting good processability.

5 Claims, No Drawings

NBR GELS IN BUTYL RUBBER COMPOUNDS

FIELD OF THE INVENTION

The present invention relates to rubber mixtures and rubber vulcanizates, produced therefrom, based on uncrosslinked butyl rubber and on acrylonitrile-containing rubber particles (so-called rubber gels, gels or microgels). The rubber mixtures according to the present invention are suitable for the production of rubber vulcanizates having low gas permeability and acceptable mechanical properties, the mixtures exhibiting good processability.

BACKGROUND OF THE INVENTION

The vulcanizates produced from the rubber mixtures according to the present invention additionally have a low density, which has an advantageous effect on the weight of the molded rubber bodies produced from the vulcanizates, such as, for example, tire tubes, inner linings and gas-impermeable protective equipment, such as ABC protective clothing.

It is known that conventional fillers such as carbon black or silica in rubber mixtures can be replaced quantitatively or partially by rubber gels. Because of the low density of rubber gels ($\rho<1$ g/cm$^3$), the corresponding vulcanizates have a lower weight than mixtures filled with carbon black ($\rho<1.8$ g/cm$^3$) or with silica ($\rho<2.1$ g/cm$^3$). In addition, when polybutadiene-based rubber gels are used (BR gels), high rebound resilience is found both at room temperature and at 70° C. Such vulcanizates can be used for the production of low-damping rubber articles, especially low-damping tire components. When SBR-based rubber gels are used, the corresponding vulcanizates are found to have low rebound resilience at room temperature and high rebound resilience at 70° C. Corresponding vulcanizates are suitable, for example, for tire treads having an advantageous wet-skid behavior/rolling resistance relation.

Reference is made in this connection, for example, to U.S. Pat. Nos. 5,124,408 and 5,395,891, DE-A 197 01 488.7, DE-A 199 29 347.3, DE-A 199 39 865.8, DE-A 199 42 620.1.

The use of NBR gels in mixtures of double-bond-containing rubbers is also known (DE-A 19701487.9). The patent applications cited above do not teach the use of rubber gels, especially of NBR gels in admixture with butyl rubber, which are suitable for the production of vulcanizates having low gas permeability, good processability and low weight.

The gas permeability coefficients of various vulcanized rubbers, and especially the low gas permeability of butyl rubbers, are known (gas permeability coefficients according to DIN 53536, see Handbuch für die Gummiindustrie, Bayer AG, 1991, p. 720). Because of their low gas permeability, butyl rubber and the halogenated (chlorinated and brominated) butyl rubbers are used in the production of rubber articles, such as, for example, tire tubes, inner linings as well as ABC protective equipment. The effect of the various compound constituents on the gas permeability of the vulcanized articles is also known (Handbuch für die Gummiindustrie, Bayer AG, 1991, p. 207–230). Compromises have to be made in order to meet various target values. One such compromise is that, in order to improve the viscosity of the mixture, it is necessary to use oils, which increase the gas permeability.

Mixtures based on butyl rubber have hitherto been filled with the conventional high-density fillers, such as carbon black or silica, the gas permeability of the vulcanizates falling as the amount of filler increases. Polymeric fillers, such as, for example, rubber gels, have hitherto not been used, possibly because of the prejudice that polymeric fillers increase the gas permeability.

SUMMARY OF THE INVENTION

The technical object was, therefore, to find measures permitting the production of rubber articles having low gas permeability, low weight and good processability of the compounds while having acceptable mechanical properties.

It has been found that this aim is achieved with rubber mixtures that contain uncrosslinked butyl rubbers and nitrile-containing rubber gels.

Accordingly, the present invention provides rubber mixtures comprising uncrosslinked butyl rubbers (A) and crosslinked, nitrile-containing rubber particles (B), the amount of component (B) in the mixture, based on 100 parts by weight (phr) of the rubber component (A), being from 1 to 150 parts by weight.

DETAILED DESCRIPTION OF THE INVENTION

The present invention provides rubber mixtures comprising uncrosslinked butyl rubbers (A) and crosslinked, nitrile-containing rubber particles (B), the amount of component (B) in the mixture, based on 100 parts by weight (phr) of the rubber component (A), being from 1 to 150 parts by weight, preferably from 5 to 100 parts by weight.

Uncrosslinked butyl rubbers (A) are to be understood as being butyl rubber (IIR), brominated butyl rubber (BIIR) and chlorinated butyl rubber (CIIR). Butyl rubbers and halogenated butyl rubbers are described in Ullmann's Encyclopedia of Industrial Chemistry, Vol. A 23 (1993) p. 288 ff and p. 314 ff.

Butyl rubber IIR is a copolymer of isobutylene with dienes such as isoprene, cyclopentadiene, pentadiene, butadiene and divinylbenzene, having a diene content of approximately from 0.5 to 10 mol. %. The preferred diene component in the butyl rubber is isoprene. Halogenated butyl rubber is obtained by chlorination (CIIR) or by bromination (BIIR) of butyl rubber and has a halogen content of approximately from 0.5 to 10 mol. %. Halobutyl rubbers are also to be understood as being terpolymers which are obtained by halogenation of isobutene/isoprene/divinylbenzene terpolymers having a divinylbenzene content of approximately from 0.5 to 5 mol. %, as well as halogenated isobutylene/p-methylstyrene copolymers having p-methylstyrene contents of approximately from 0.5 to 10 mol. %.

The halogenated and the unhalogenated butyl rubbers may be used individually or in a mixture with one another, the mixing ratio depending on the particular intended use of the mixtures.

Nitrile-containing rubber particles (B) are to be understood as being NBR gels as described, for example, in DE-A 19701487.9. NBR gels are usually composed of the monomers acrylonitrile, methacrylonitrile, butadiene, styrene, divinylbenzene, vinylpyridine, 2-chlorobutadiene, 2,3-dichlorobutadiene, as well as bisacrylates or bismethacrylates, such as ethylene glycol dimethacrylate and butanediol dimethacrylate, as well as a carboxyl-group-containing monomer, such as acrylic acid, methacrylic acid, maleic acid, fumaric acid and itaconic acid. Preference is given to nitrile-containing gels that contain, in addition to the above-mentioned monomers, contents of acrylonitrile or methacrylonitrile in amounts of approximately from 5 to 80 wt. %. They include NBR gels based on butadiene/acrylonitrile copolymers (NBR) having acrylonitrile contents of from 15 to 60 wt. %, as well as the corresponding carboxylated gels (XNBR gels), which additionally contain carboxyl-group-containing monomers in amounts of approximately from 0.5 to 15 wt. %.

The rubber particles to be used according to the present invention usually have particle diameters of from 5 to 1000 nm, preferably from 10 to 600 nm (data relating to diameters are according to DIN 53 206). Because they are crosslinked, they are insoluble and are swellable in suitable solvents, for example, toluene. The swelling indices of the rubber particles (QI) in toluene are approximately from 1 to 15, preferably from 1 to 10. The swelling index is calculated from the weight of the solvent-containing gel (after centrifugation at 20,000 rpm) and the weight of the dry gel, where QI=wet weight of the gel/dry weight of the gel. The gel content of the rubber particles according to the present invention is usually from 80 to 100 wt. %, preferably from 90 to 100 wt. %.

The rubber mixtures according to the present invention may contain further known rubber auxiliary substances and fillers. Especially suitable fillers for the production of the rubber mixtures or vulcanizates according to the present invention are, for example:

- carbon blacks. The carbon blacks to be used have been prepared by the flame carbon black, furnace or gas carbon black process and have BET surface areas of from 20 to 200 m$^2$/g, such as, for example, SAF, ISAF, IISAF, HAF, FEF or GPF carbon blacks and graphite.
- highly dispersed silica, prepared, for example, by precipitation of solutions of silicates or flame hydrolysis of silicon halides having specific surface areas of from 5 to 1000 m$^2$/g, preferably from 20 to 400 m$^2$/g (BET surface area) and primary particle sizes from 5 to 400 nm. The silicas may optionally also be present in the form of mixed oxides with other metal oxides, such as Al, Mg, Ca, Ba, Zn and Ti oxides.
- synthetic silicates, such as aluminum silicate, alkaline-earth silicates, such as magnesium silicate or calcium silicate having BET surface areas of from 20 to 400 m$^2$/g and primary particle diameters of from 5 to 400 nm.
- natural silicates, such as kaolin (clay) and other naturally occurring silicas.
- metal oxides, such as zinc oxide, calcium oxide, magnesium oxide, aluminum oxide.
- metal carbonates, such as calcium carbonate, magnesium carbonate, zinc carbonate.
- metal sulfates, such as calcium sulfate, barium sulfate.
- metal hydroxides, such as aluminum hydroxide and magnesium hydroxide.
- glass fibers and glass fiber products (laths, threads or glass microspheres).
- thermoplastic fibers (polyamide, polyester, aramid).

The fillers may be used in amounts of from 0.1 to 100 parts by weight, based on 100 parts by weight of the rubber component A.

The mentioned fillers may be used alone or in a mixture with one another.

Special preference is given to rubber mixtures containing from 10 to 100 parts by weight of crosslinked nitrile-group-containing rubber particles (component B), from 0.1 to 100 parts by weight of carbon black and/or from 0.1 to 100 parts by weight of so-called light fillers of the abovementioned type, in each case based on 100 parts by weight of the rubber component (A). When a mixture of rubber gel, carbon black and light fillers is used, the amount of fillers is not more than approximately 150 parts by weight.

The rubber mixtures according to the present invention may—as mentioned—contain further rubber auxiliary substances, such as crosslinking agents, vulcanization accelerators, anti-aging agents, heat stabilizers, light stabilizers, anti-ozonants, processing aids, plasticizers, tackifiers, blowing agents, colorings, pigments, wax, extenders, organic acids, retarding agents, metal oxides, as well as filler activators, such as triethanolamine, polyethylene glycol, hexanetriol, bis-(triethoxysilylpropyl) tetrasulfide. The rubber auxiliary substances are described, for example, in "Butyl and Halobutyl Compounding Guide for non-tire Applications" 12/92 Rubber business group, and in Handbuch für die Gummiindustrie, Bayer AG, 2nd edition, 1991.

The rubber auxiliary substances are used in conventional amounts, which are dependent inter alia on the intended use. Conventional amounts are, for example, from 0.1 to 50 parts by weight, based on 100 parts by weight of rubber (A).

The rubber mixtures according to the present invention may also contain conventional crosslinking agents, such as sulfur, sulfur donors, peroxides or other crosslinking agents, such as diisopropenylbenzene, divinylbenzene, divinyl ether, divinylsulfone, diallyl phthalate, triallyl cyanurate, triallyl isocyanurate, 1,2-polybutadiene, N,N'-m-phenylenemaleimide and/or triallyl trimellitate. In addition, there come into consideration also the acrylates and methacrylates of polyhydric, preferably from di- to tetra-hydric, $C_2$ to $C_{10}$ alcohols, such as ethylene glycol, propanediol-1, 2-butanediol, hexanediol, polyethylene glycol having from 2 to 20, preferably from 2 to 8, oxyethylene units, neopentyl glycol, bisphenol A, glycerol, trimethylpropane, pentaerythritol, sorbitol with unsaturated polyesters of aliphatic diols and polyols as well as maleic acid, fumaric acid and/or itaconic acid.

Crosslinking agents, which are preferably used, are sulfur and sulfur donors in the known amounts, for example in amounts of from 0.1 to 10 parts by weight, preferably from 0.5 to 5 parts by weight, based on 100 parts by weight of rubber component (A).

The rubber mixtures according to the present invention may also contain vulcanization accelerators of the known type, such as mercaptobenzothiazoles, mercaptosulfenamides, guanidines, thiurams, dithiocarbamates, thioureas, thiocarbonates and/or dithiophosphates. The vulcanization accelerators, like the crosslinking agents, are used in amounts of approximately from 0.1 to 10 parts by weight, preferably from 0.1 to 5 parts by weight, based on 100 parts by weight of rubber component (A).

The rubber mixtures according to the present invention can be prepared in a known manner, for example by mixing the individual solid components in apparatuses suitable therefor, such as mills, internal mixers or mixing extruders. Blending of the individual components with one another is usually carried out at mixing temperatures of from 20 to 100° C.

The rubber mixtures according to the present invention can also be produced by from the latexes of the rubber component (A) and component (B) in latex form and mixing the other components into the latex mixture (components A+B) and then working up the mixture by conventional operations, such as concentration by evaporation, precipitation or freeze-coagulation.

The goal when producing the rubber mixture according to the present invention is, above all, to mix the components of the mixture with one another intimately and to achieve good dispersion of the fillers used in the rubber matrix.

The rubber mixtures according to the present invention are suitable for the production of rubber vulcanizates by corresponding crosslinking reactions with the known crosslinking agents, and are used in the production of molded bodies of all kinds, especially in the production of rubber articles such as tire tubes, inner linings, protective clothing, pharmaceutical stoppers, tank linings, damping elements, gaskets, hoses, conveyor belts and membranes.

EXAMPLES

TABLE 1

| NBR type | Acrylonitrile content [wt. %] | Amount of DCP [phr] | Gel | Diameter $d_{50}$ [nm] | Density of the latex particles [g/cm³] | Gel content [%] | QI | Tg [° C.] |
|---|---|---|---|---|---|---|---|---|
| 2830[a] | 28 | 0 | | 117 | 0.9644 | 3.3 | 11.8 | −36.5 |
| 2830[a] | 28 | 3 | (1) OBR 1085[c] | 110 | 0.9697 | 97 | 6.9 | −29 |
| 3945[b] | 39 | 0 | | 103 | 0.9859 | 82.4 | 4.9 | −21 |
| 3945[b] | 39 | 3 | (2) OBR 1086[d] | 103 | 0.9999 | 98 | 5 | −10.5 |

[a]Perbunan ® NT 2830 from Bayer AG (nitrile rubber containing 28 wt. % acrylonitrile, Mooney viscosity at 100° C.: 30 ME)
[b]Perbunan ® NT 3945 from Bayer AG (nitrite rubber containing 39 wt. % acrylonitrile, Mooney viscosity at 100° C.: 45 ME)
[c]Nitrite rubber gel based on Perbunan ® NT 2830 latex, obtained by crosslinking with 3 phr dicumyl peroxide (DCP)
[d]Nitrile rubber gel based on Perbunan ® NT 3945 latex, obtained by crosslinking with 3 phr dicumyl peroxide (DCP)

Production of the Rubber Mixtures, Vulcanization Thereof, and the Measured Physical Values of the Vulcanizates In order to demonstrate the effects according to the present invention, the following compounds were used:
Series of Mixtures The mixture constituents listed in the following table (amounts are given in phr) were mixed in the conventional manner in a laboratory mill.

TABLE 2

| Mixture no.: | 1 | 2 | 3 | 4 | 5 | 6 |
|---|---|---|---|---|---|---|
| Bromobutyl 2030[1] | 100 | 100 | 100 | 100 | 100 | 100 |
| Carbon black N 660 | 60 | 60 | | | | |
| OBR 1085[c] | | | 60 | 60 | | |
| OBR 1086[c] | | | | | 60 | 60 |
| Paraffin oil[2] | 7 | | 7 | | 7 | |
| Resin[3] | 4 | 4 | 4 | 4 | 4 | 4 |
| Stearic acid | 1 | 1 | 1 | 1 | 1 | 1 |
| MBTS[4] | 1.3 | 1.3 | 1.3 | 1.3 | 1.3 | 1.3 |
| Zinc oxide | 3 | 3 | 3 | 3 | 3 | 3 |
| Sulfur | 0.5 | 0.5 | 0.5 | 0.5 | 0.5 | 0.5 |

[1]Bromobutyl rubber from Bayer Inc. Canada
[2]Sunpar 2280 from Sunoco Inc.
[3]Pentalyn A from Hercules Inc.
[4]Dibenzthiazyl disulfide (Vulkacit ® DM from Bayer AG)

The following parameters were determined on the unvulcanized mixture:

TABLE 3

| Mixture no.: | 1 | 2 | 3 | 4 | 5 | 6 |
|---|---|---|---|---|---|---|
| Compound Mooney ML 1 + 4/100° C. | 62 | 72 | 54 | 64 | 56 | 66 |
| Mooney relaxation MR 30 [%] | 5.5 | 5.1 | 8.9 | 11.2 | 9 | 10.8 |
| Monsanto tack [N] | 2.2 | 2.3 | 1.4 | 1.5 | 1.2 | 1.8 |

The vulcanization behavior of the mixtures is tested in a rheometer at 165° C. according to DIN 53 529 with the aid of the Monsanto rheometer MDR 2000E. Characteristic data such as $F_a$, $F_{max}$, $F_{max}-F_a$, $t_{50}$ and $t_{90}$ were thus determined.

TABLE 4

| Mixture no.: | 1 | 2 | 3 | 4 | 5 | 6 |
|---|---|---|---|---|---|---|
| $F_a$ [dNM] | 1.7 | 1.8 | 1.8 | 2.2 | 1.8 | 2.3 |
| $F_{max}$ [dNM] | 7.1 | 8.0 | 3.7 | 4.3 | 3.3 | 3.9 |
| $F_{max} - F_a$ [dNM] | 5.4 | 6.2 | 1.9 | 2.1 | 1.5 | 1.6 |
| $t_{50}$ [min.] | 3.2 | 3.1 | 5.3 | 5 | 5.6 | 5 |
| $t_{90}$ [min.] | 8.7 | 8.5 | 19.8 | 19.4 | 21.3 | 20.1 |

According to DIN 53 529, Part 3:

$F_a$ = vulcameter reading at the minimum of the crosslinkage isotherm $F_{max}$ = maximum vulcameter reading $F_{max} - F_a$ = difference between the maximum and minimum vulcameter readings $t_{50}$ = time at which 50% of conversion is achieved $t_{90}$ = time at which 90% of conversion is achieved The following properties of the vulcanizates were determined: TABLE 5

TABLE 5

| Mixture no.: | 1 | 2 | 3 | 4 | 5 | 6 |
|---|---|---|---|---|---|---|
| Tensile strength (F) [MPa] | 8.9 | 10.5 | 11.5 | 11.5 | 8.8 | 11.8 |
| Ultimate elongation (D) [%] | 670 | 650 | 482 | 521 | 369 | 470 |
| Tensile stress at 50% elongation ($S_{50}$) [MPa] | 0.8 | 0.9 | 1.8 | 1.4 | 3.5 | 0.8 |
| Tensile stress at 100% elongation ($S_{100}$) [MPa] | 1.1 | 1.7 | 2.7 | 2.1 | 4.3 | 1.5 |
| Tensile stress at 300% elongation ($S_{300}$) [MPa] | 4.0 | 5.4 | 6.6 | 5.4 | 7.6 | 6 |
| Shore A hardness, 23° C. | 58 | 60 | 30 | 33 | 29 | 33 |
| Shore A hardness, 70° C. | 40 | 47 | 23 | 27 | 20 | 24 |
| Rebound resilience at 23° C. ($E_{23}$) [%] | 9 | 9 | 18 | 19 | 9 | 9 |
| Rebound resilience at 70° C. ($E_{70}$) [%] | 29 | 30 | 57 | 59 | 57 | 56 |
| Air permeability at 70° C. (DIN 53536) [$m^2$/s Pa] | 3.0 | 2.3 | 4.7 | 4 | 3.2 | 2.7 |

Result:

In the present series of mixtures it is shown that, when the filler carbon black is replaced by NBR gels, rubber compounds are obtained that exhibit good processability (low compound viscosities) and acceptable mechanical properties in the vulcanized state, coupled with low gas permeability—the gas permeability of the vulcanizate falling as the acrylonitrile content of the NBR gel increases.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber mixtures comprising a) uncrosslinked butyl rubbers (A) and crosslinked and b) nitrile-containing rubber particles (B), the amount of component (B) in the mixture, based on 100 parts by weight (phr) of the rubber component (A), being from 1 to 150 parts by weight, wherein component (A) is selected from the group consisting of bromobutyl rubber (BIIR), chlorobutyl rubber (CIIR) and a mixture thereof.

2. Rubber mixtures according to claim 1, wherein from 5 to 100 parts by weight of crosslinked nitrile-containing rubber particles (B), based on 100 parts by weight of the rubber component (A), are present in the rubber mixture.

3. Rubber mixtures according to claim 1, wherein the crosslinked nitrile-containing rubber particles (B) have particle diameters of from 5 to 1000 nm and swelling indices in toluene of from 1 to 15.

4. Rubber vulcanizates and molded rubber bodies comprising rubber mixtures which comprises a) uncrosslinked butyl rubbers (A) and crosslinked and b) nitrile-containing rubber particles (B), the amount of component (B) in the mixture, based on 100 parts by weight (phr) of the rubber component (A), being from 1 to 150 parts by weight wherein component (A) is selected from the group consisting of bromobutyl rubber (BIIR), chlorobutyl rubber (CIIR) and a mixture thereof.

5. Rubber vulcanizates and molded rubber bodies according to claim 4, wherein said rubber vulcanizates and molded rubber bodies are tire tubes, inner linings, protective clothing, pharmaceutical stoppers, tank linings, damping elements, gaskets, hoses, conveyor belts or membranes.

* * * * *